United States Patent [19]

Hirayama et al.

[11] Patent Number: 4,964,001
[45] Date of Patent: Oct. 16, 1990

[54] MAGNETIC RECORDING/REPRODUCING APPARATUS FOR SELECTIVE USE WITH TAPE CASSETTES OF TWO DIFFERENT SIZES

[75] Inventors: Hiromichi Hirayama, Yokohama; Masato Mihara, Hiratsuka; Mitsuo Harumatsu, Ota, all of Japan

[73] Assignee: Victor Company of Japan, Ltd., Yokohama, Japan

[21] Appl. No.: 392,858

[22] Filed: Aug. 11, 1989

[30] Foreign Application Priority Data

Aug. 11, 1988 [JP] Japan .................................. 63-200702
Aug. 11, 1988 [JP] Japan .................................. 63-200703
Aug. 23, 1988 [JP] Japan ......................... 63-110184[U]

[51] Int. Cl.⁵ ...................... G11B 15/675; G11B 5/008
[52] U.S. Cl. ....................................... 360/94; 360/96.5
[58] Field of Search ....................... 360/84, 85, 94, 95, 360/96.5, 96.6; 242/197–201

[56] References Cited

U.S. PATENT DOCUMENTS 4,782,408 11/1988 Inoue et al. ............................ 360/94
4,853,805 8/1989 Baranski ................................ 360/94
4,866,550 9/1989 Ohashi et al. ......................... 360/94

*Primary Examiner*—David J. Severin
*Attorney, Agent, or Firm*—Fleit, Jacobson, Cohn, Price, Holman & Stern

[57] ABSTRACT

A compatible recording/reproducing apparatus for selective use with a standard-size tape cassette and compact-size tape cassette. Included is a main chassis having a set of fixed positioned pins for positioning the standard-size tape cassette thereon, and a pair of drive spindles for driving engagement with the reel hubs of the standard-size tape cassette. A floating chassis, much less in size than the main chassis, is mounted thereto for displacement in a direction at right angles with the principal plane of the main chassis. The floating chassis has mounted thereon another set of positioning pins for positioning the compact-size tape cassette thereon, and a drive gear for driving engagement with a driven gear incorporatd with the compact-size tape cassette. Positioned on the floating chassis, the compact-size tape cassette has its magnetic tape transported by the drive gear and one of the drive spindles on the main chassis. When the standard-size tape cassette is loaded in the apparatus, the floating chassis is retracted out of interference with the standard-size tape cassette, permitting the same to be positioned on the set of positioning pins on the main chassis and driven by the pair of drive spindles.

12 Claims, 12 Drawing Sheets

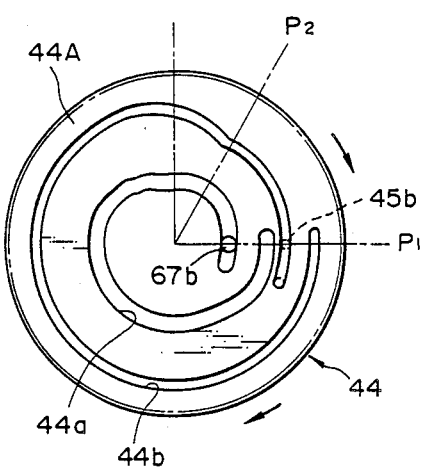
FIG.9A
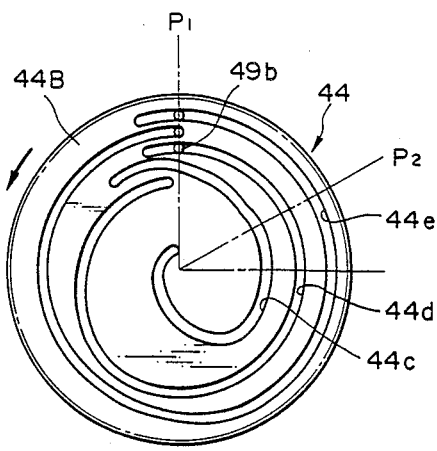
FIG.9B
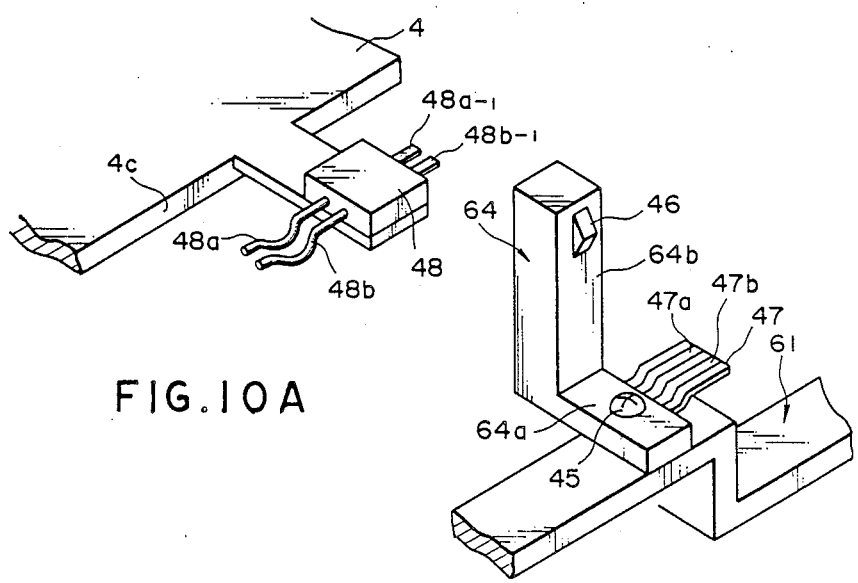
FIG.10A
FIG.10B

MAGNETIC RECORDING/REPRODUCING APPARATUS FOR SELECTIVE USE WITH TAPE CASSETTES OF TWO DIFFERENT SIZES

BACKGROUND OF THE INVENTION

This invention relates generally to an apparatus for recording and/or reproducing data on record media, and particularly to such an apparatus for use with magnetic tape packaged in cassette form More particularly, the invention pertains to a compatible recording/reproducing apparatus that can be put to selective use with standard-size tape cassettes and with those of smaller size.

Video tape cassettes are commercially available today in two different sizes, that is, standard size and compact size. Standard-size tape cassettes find widespread use with video tape recorders or decks of standard design. Compact-size cassettes have more recently been developed for use with portable video cameras. The majority of prior art tape decks have been constructed for use with standard-size cassettes only. Adapters have therefore been needed for using the compact-size cassettes on such tape decks. The compact-size cassette has had to be first loaded in the adapter, and the loaded adapter has then been inserted in the deck.

The advent of truly compatible tape decks has thus been awaited by the users in order to eliminate the trouble with use of cassette adapters. One conventional approach to this problem is found in Japanese Patent Application No. 61-54069. This prior application suggests an apparatus having a pair of drive spindles for direct driving engagement with the associated reels of both standard- and compact-size tape cassettes. The drive spindles are moved horizontally to preassigned positions required by the particular size of the cassette loaded and then are engaged with the cassette reels for the commencement of recording or reproduction.

This prior art apparatus has several shortcomings that must be eliminated to establish the true utility of the compatible magnetic tape cassette apparatus. First, the prior art apparatus does not lend itself to use with compact-size tape cassettes of the commercially available type such that the takeup reel is driven via a set of gear teeth formed on its bottom reel flange.

Another shortcoming of the known apparatus manifests itself in connection with the upstanding positioning pins which are commonly employed for holding the loaded tape cassette in a preassigned position within the apparatus. The positioning pins of the compatible tape cassette apparatus must themselves take different positions depending upon the size of the tape cassette being loaded. The movement of the positioning pins has been totally independent of the movement of the drive spindles in the prior art apparatus, with the consequent likelihood of misalignment taking place between the relative positions of the drive spindles and the positioning pins.

Still another drawback of the prior art arises in conjunction with the familiar file protect, or anti-erase, tabs on tape cassettes. The tape cassette apparatus in general is equipped with a sensor for detecting the file protect tab as each tape cassette is loaded. The positions of the file protect tabs differ between the standard- and compact-size cassettes. For detecting the tab on the compact-size cassette, the sensor must be in such a position as to interfere with the loading of the standard-size cassette. It has therefore been suggested to move the sensor up and down as well as the relocation of the positioning pins. This solution is objectionable because of different means required for the displacements of the sensor, the positioning pins and the drive spindles. Here again, misalignment has been very easy to occur among the relative positions of such movable members.

A further problem left unsolved in the art is the placement of the capstan and the capstan motor with respect to the loading positions of the standard- and compact-size tape cassettes. The capstan has so far been positioned so close to the loading positions that the capstan motor has partly underlaid them, making it difficult to reduce the thickness or vertical dimension of the apparatus to a minimum. The capstan and the capstan motor should be horizontally kept remote from the loading positions of the tape cassettes for minimizing the vertical dimension of the apparatus.

However, with the capstan remote from the loading positions of the tape cassettes, the magnetic tape must be pulled out of the loaded cassette a correspondingly longer distance for engagement with the capstan. This requires the use of an elongate guide arm carrying a guide pole for pulling out the tape. Such an elongate guide arm would be undesirable because of the possibility of its deflection taking place under tape tension, particularly during the fast-forwarding or rewinding of the tape. The elongate guide arm would also be susceptible to vibrations, adversely affecting the desired stability of tape transportation during recording and reproduction. It might be contemplated to build the guide arm strong and sturdy enough to withstand such deflection or vibration. This solution would be unpractical in view of the added weight of the arm, and of the objective of reducing the thickness of the complete apparatus.

There is another difficulty that must be defeated in order to position the capstan and the capstan motor at a distance from the loading positions of the tape cassettes. The guide arm must then swing past one of the positioning pins for the standard-size tape cassette. This positioning pin must therefore be so supported as to avoid interference with the guide arm. Thus, in short, the capstan cannot possibly be positioned a required distance away from the loading positions of the tape cassettes unless the insufficient mechanical strength of the elongate guide arm is compensated for and, at the same time, unless the collision of the guide arm with one of the positioning pins is avoided.

SUMMARY OF THE INVENTION

The present invention overcomes all the listed weaknesses of the prior art and establishes the true compatibility and utility of a recording/reproducing apparatus for selective use with tape cassettes of two different sizes.

Briefly, the invention may be summarized as a compatible recording/reproducing apparatus for selective use with a relatively large-size (standard-size) tape cassette and a relatively small-size (compact-size) tape cassette, with the small-size tape cassette having a driven gear. The apparatus comprises a main chassis on which there are mounted both fixed positioning means (e.g. positioning pins) for positioning the large-size tape cassette thereon, and a pair of drive spindles for driving engagement with the reels of the large-size tape cassette positioned on the fixed-d positioning means. A floating chassis, which typically is much less in size than the main chassis, is mounted thereto for displacement in a direction at right angles with the principal plane of the main chassis. The floating chassis has mounted thereon second positioning means (e.g. positioning pins) for positioning the small-size tape cassette thereon, and a drive gear for driving engagement with the driven gear of the small-size tape cassette positioned on the second positioning means. Also included are floating-chassis drive means for moving the floating chassis relative to the main chassis between a working position, where the small-size tape cassette is positioned on the floating chassis for recording or reproduction, and a retracted position where the floating chassis with the various means mounted thereon does not interfere with the large-size tape cassette positioned on the first positioning means on the main chassis.

Thus, when the standard-size tape cassette is loaded in the apparatus, the floating chassis is retracted, permitting the loaded cassette to be driven by the pair of drive spindles on the main chassis. Upon loading of the compact-size tape cassette, the floating chassis is moved to the working position to permit the cassette positioned thereon. The compact-size tape cassette on the floating chassis is driven by the drive gear on the floating chassis and by one of the drive spindles on the main chassis. No adapter is needed for loading the compact-size tape cassette.

The positioning pins and the drive spindles (and preferably an anti-erase sensor, too) for the standard-size tape cassette are all mounted in preassigned positions on the main chassis. The positioning pins and the drive gear (and preferably an anti-erase sensor, too) for the compact-size tape cassette, on the other hand, are all mounted in preassigned positions on the floating chassis. Consequently, both types of tape cassettes can be accurately positioned within the apparatus for trouble-free operation.

Additionally, the positioning pins and other parts that are necessary for use of the apparatus with the compact-size tape cassette are all mounted on the floating chassis. The relative positions of these parts remain absolutely unchanged regardless of the position of the floating chassis with respect to the main chassis. The mounting of all such parts on the floating chassis makes the apparatus simpler and less expensive in construction than if such parts were moved individually.

A further feature of the invention resides in means for positively locking the floating chassis in the working position in the face of possible external forces that may be exerted on the floating chassis in use of the apparatus. The locking means is highly simplified in construction as it is driven by taking advantage of the fact that the standard- and compact-size tape cassettes, on being loaded in the apparatus, are transferred to different record/reproduce positions. The provision of such positive locking means serves to protect the drive means of the floating chassis from destruction due to the possible external forces applied to the floating chassis.

The apparatus of this invention is also well calculated for the reduction of its vertical dimension or thickness to a minimum, by positioning the capstan and the capstan motor at a sufficient distance away from the loading positions of both types of tape cassettes. Although this arrangement requires the use of an elongate guide arm, with the resulting inconveniences set forth in connection with the prior art, such inconveniences are overcome by providing an arm rest formed on the main chassis for stably holding the guide arm when the latter is swung to a position for holding the magnetic tape, pulled out from either type of tape cassette, against the capstan. One of the positioning pins for the standard-size tape cassette is erected on this arm rest, thus avoiding collision with the guide arm.

It will therefore be appreciated that the arm rest serves the dual purpose of holding the elongate guide arm against deflection or vibration due to tape travel in contact with the guide pole thereon, and of supporting one of the positioning pins so as to permit the guide arm to swing past the pin. Since this positioning pin imposes no limit on the angle through which the guide arm swings, the capstan and the capstan motor can be disposed the required distance away from the loading positions of the tape cassettes for the minimization of the vertical dimension of the apparatus.

The above and other features and advantages of this invention and the manner of realizing them will become more apparent, and the invention itself will best be understood, from a study of the following description and appended claims, with reference had to the attached drawings showing the preferred embodiment of the invention.

BRIEF DESCRIPTION OF THE DRAWINGS

FIGS. 9A and 9B are plan views showing the opposite sides, respectively, of the drive cam, the views being explanatory of how the floating chassis is moved between the working and retracted positions;

FIGS. 10A and 10B are perspective views conjointly showing the tape kind sensor on the floating chassis and means for its electric connection to the electronic circuitry, not shown, of the apparatus;

DESCRIPTION OF THE PREFERRED EMBODIMENT

Figure 1:
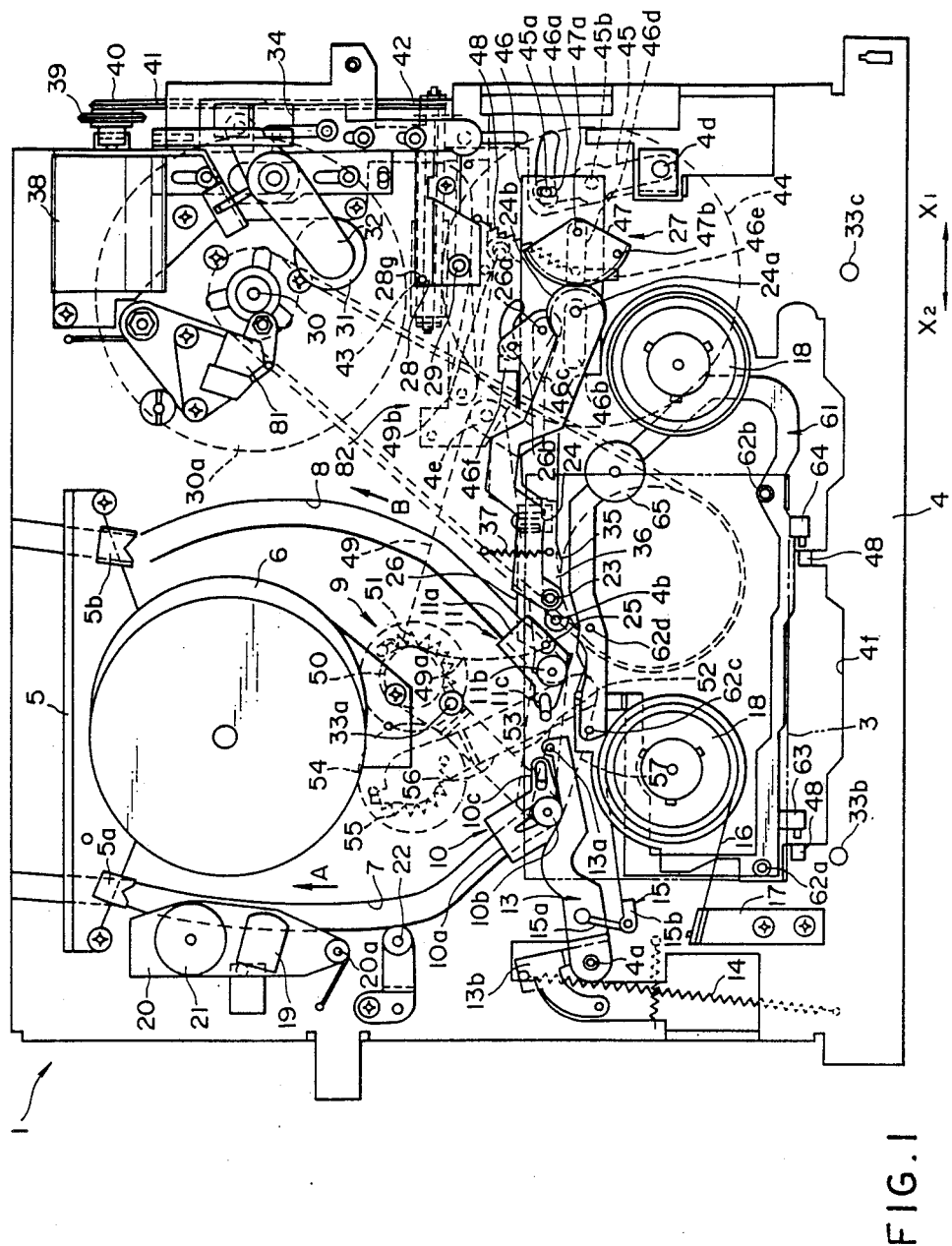
FIG. 1 is a plan view of the compatible recording/reproducing apparatus constructed in accordance with the invention, the apparatus being shown with a compact-size tape cassette loaded therein.
Figure 2:
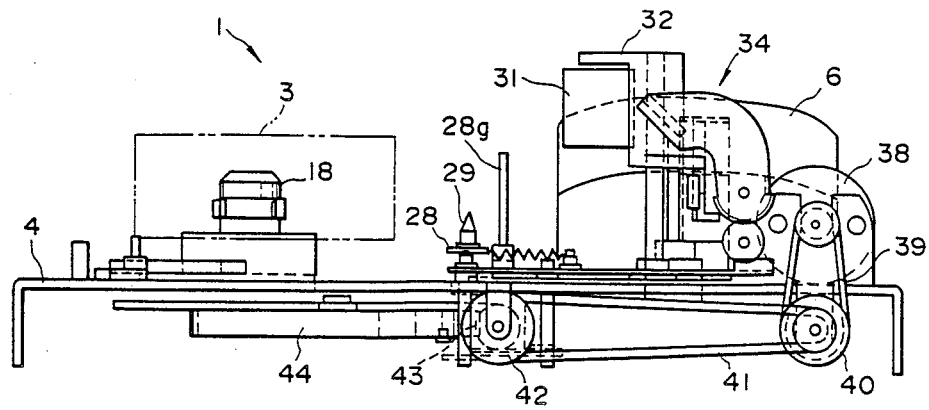
FIG. 2 is a right-hand side elevation of the apparatus of FIG. 1.
Figure 3:
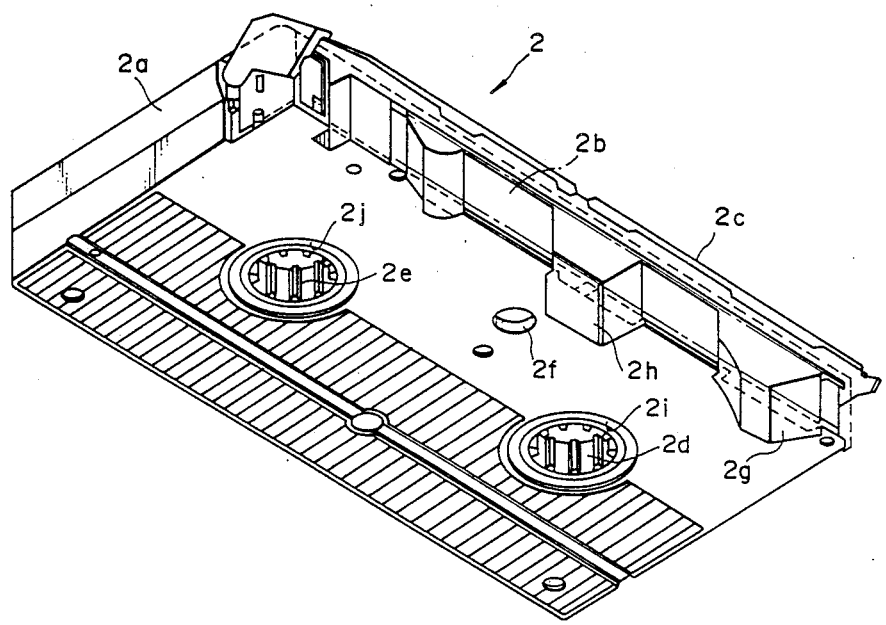
FIG. 3 is a perspective view of a standard-size tape cassette for use with the apparatus of FIG. 1.
Figure 4A:
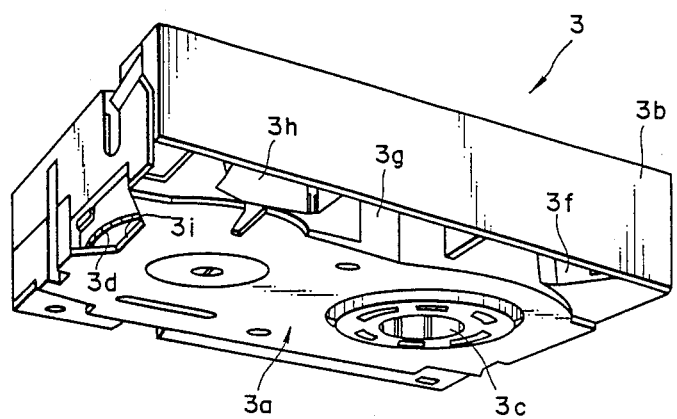
FIG. 4A is a perspective view of the compact-size tape cassette shown loaded in the apparatus of FIG. 1, the view showing the cassette as seen from its bottom side.
Figure 4B:
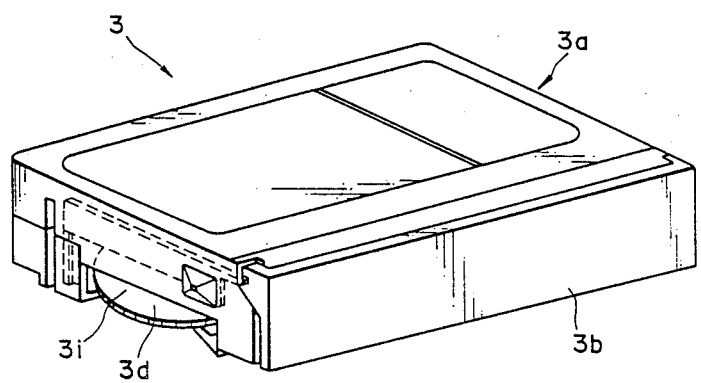
FIG. 4B is a view similar to FIG. 4A except that the compact-size tape cassette is shown as seen from its top side.

The compatible magnetic recording/reproducing apparatus 1 shown in FIGS. 1 and 2 is intended for selective use with a standard-size tape cassette 2 of FIG. 3 and a compact-size tape cassette 3 of FIGS. 4A and 4B. The two types of tape cassettes 2 and 3 may be interchangeably loaded in the apparatus 1 without use of any adapter. It will redound to an easier understanding of the invention to first describe the standard- and compact-size tape cassettes 2 and 3 and then to proceed to the description of the apparatus 1.

With reference therefore to FIG. 3, the standard-size tape cassette 2 illustrated in perspective therein has a housing 2a of generally flat, boxlike shape. The cassette housing 2a has a hinged cover 2c at its front end by way of protection of a front tape path 2b. Behind this tape path 2b the cassette housing 2a has recesses 2g and 2h formed in its front end. The bottom of the cassette housing 2a has two holes 2i and 2j to expose a supply reel hub 2d and a takeup reel hub 2e which are both rotatably mounted within the housing for reel-to-reel tape transportation. An additional hole 2f of smaller diameter, formed approximately centrally in the bottom of the cassette housing 2a, is intended for the insertion of a light source (seen at 35 in FIG. 1) for tape end detection.

The compact-size tape cassette 3 of FIGS. 4A and 4B, on the other hand, also has a housing 3a of generally flat, boxlike shape but smaller in size than the housing 2a of the standard-size tape cassette 2. The cassette housing 3a has a hinged cover 3b at its front end in which there are defined three recesses 3f, 3g and 3h. A hole 3c is formed in the bottom of the cassette housing 3a to expose a supply reel hub, not shown, which is rotatably mounted therein. An aperture 3i is formed in the bottom and one side edge of the cassette housing 3a to expose a gear 3d formed in one piece with the takeup reel, not shown, which also is rotatably mounted within the cassette housing. The takeup reel of the compact-size tape cassette 3 is to be driven through the gear 3d.

Figure 5:
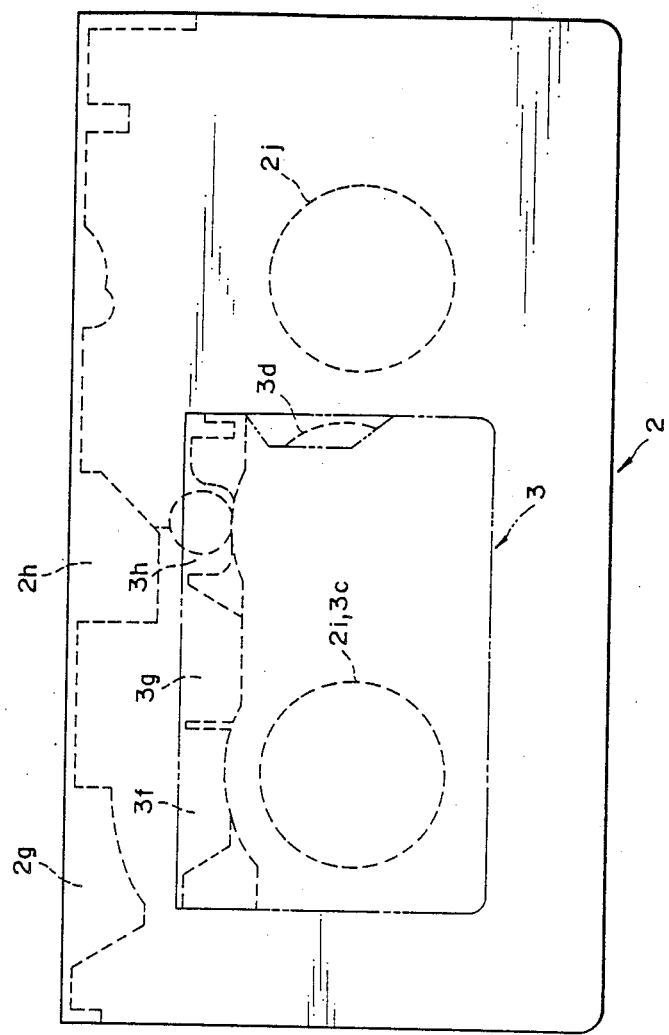
FIG. 5 is a plan view of an explanatory nature showing the standard- and compact-size tape cassettes in correct dimensional relationship.

In FIG. 5 are shown both the standard-size tape cassette 2 and the compact-size tape cassette 3 in the correct dimensional relationship. A very substantial difference will be observed between their sizes and, of course, between their reel-to-reel distances. A difference also exists between the driving methods of their takeup reels. The compatible recording/reproducing apparatus 1 of FIGS. 1 and 2 is well adapted for handling both types of tape cassettes 2 and 3.

FIG. 5 also shows the two tape cassettes 2 and 3 in their relative positions when loaded in the apparatus 1. The supply hub hole 2i in the standard-size tape cassette 2 is in axial alignment with the supply hub hole 3c in the compact-size tape cassette 3. It will also be noted that, with the tape cassettes 2 and 3 so positioned within the apparatus 1, a considerable difference exists between the horizontal positions of the recesses 2g and 2h in the standard-size tape cassette 2 and of the recesses 3f, 3g and 3h in the compact-size tape cassette 3.

With the foregoing constructional and dimensional differences between the two tape cassettes 2 and 3 in mind, the compatible magnetic recording/reproducing apparatus 1 for selective use therewith will now be described in detail.

As will be understood from FIG. 1, taken together with FIG. 2, the magnetic recording/reproducing apparatus 1 has a main chassis 4 of generally rectangular shape laid horizontally. Mounted on the main chassis 4 are, first of all, a pair of upstanding drive spindles 18 for driving engagement with the reel hubs of the standard-size tape cassette 2 as the latter is loaded in a preassigned position within the apparatus 1. The preassigned loading position of the standard-size tape cassette is indicated by its phantom outline in FIG. 8. The left-hand drive spindle 18, as seen in FIG. 1, is also intended for driving engagement with one of the reel hubs of the compact-size tape cassette 3 indicated by the phantom outline in this figure.

The main chassis 4 has also erected thereon four positioning pins 29, 33a, 33b and 33c which determine the height or vertical position of the standard-size tape cassette 2. As better shown in FIG. 2, the takeup-side positioning pin 29 is mounted on an arm rest or support 28 to be detailed subsequently. The supply-side positioning pin 33a is formed directly on the main chassis 4 just in front of the rotary head assembly 6. The other two positioning pins 33b and 33c are also mounted directly on the main chassis 4.

Also mounted on the main chassis 4 via a fixed base 5 is a rotary magnetic head assembly 6 disposed rearwardly, or upwardly as viewed in FIG. 1, of the loading positions of the standard- and compact-size tape cassette 2 and 3. A pair of elongate slots 7 and 8 are formed arcuately in the main chassis 4 on the opposite sides of the rotary head assembly 6. These arcuate slots 7 and 8 serve as guideways for a pair of tape loader assemblies 10 and 11, which are slidably engaged one in each slot.

As the standard- or compact-size tape cassette 2 or 3 is loaded in the apparatus 1, the tape loader assemblies 10 and 11 are to travel along the guideways 7 and 8 for pulling out the magnetic tape from the loaded tape cassette and wrapping the tape a predetermined angle around the rotary head assembly 6 for recording or reproduction. Since the tape must be pulled out from both types of tape cassettes 2 and 3, the guideways 7 and 8 extend further toward the loading positions of the cassettes than in the known apparatus designed for use with standard-size tape cassettes only.

Each tape loader assembly 10 or 11 comprises a carriage 10a or 11a slidably engaged in the guideway 7 or 8, a guide roller 10b or 11b erected on the carriage, and a slanting pole 10c or 11c formed on the carriage.

Figure 8:
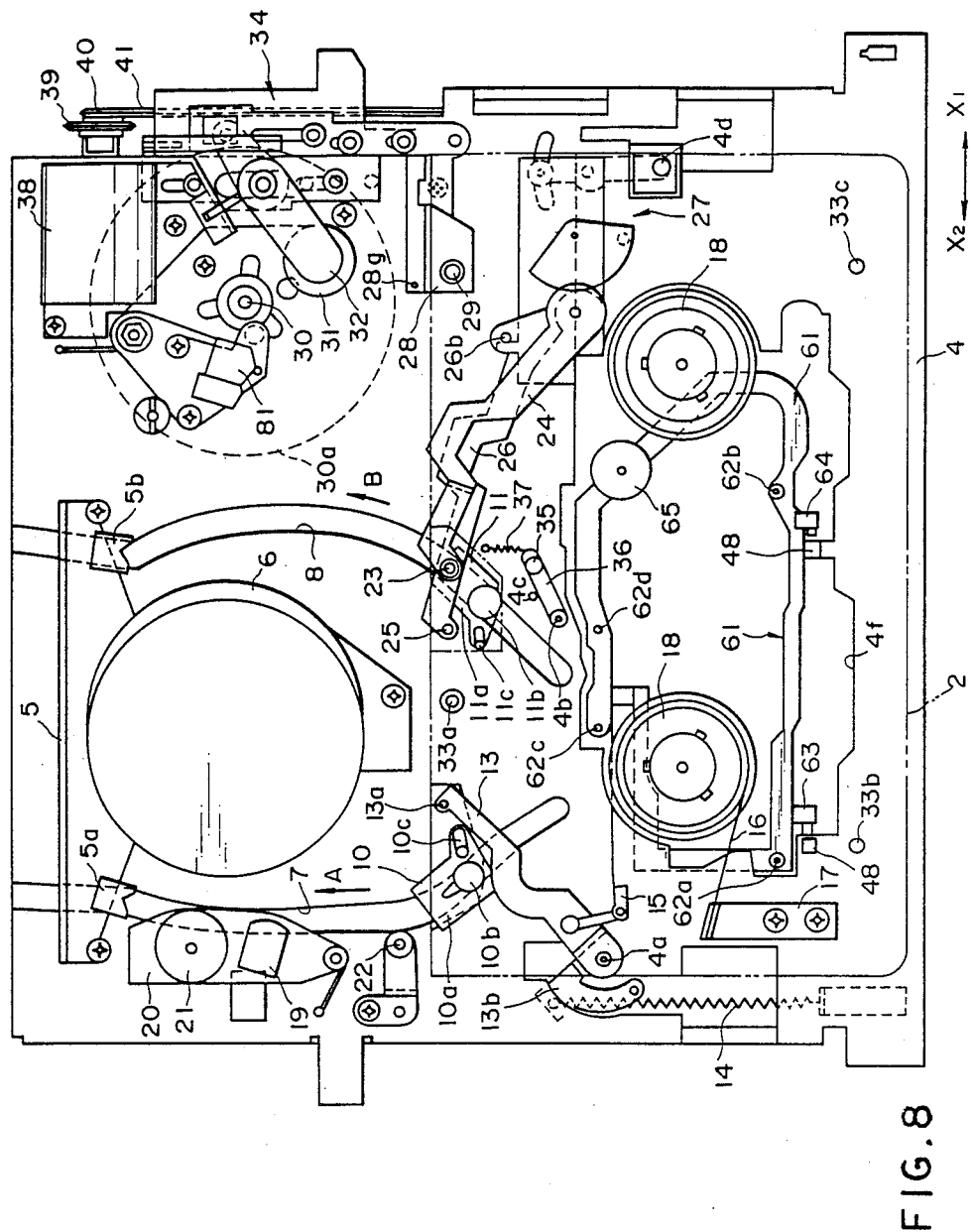
FIG. 8 is a view similar to FIG. 1 except that the apparatus is shown with the standard-size tape cassette loaded therein.

Driven by a tape loader drive mechanism 9, the tape loader assemblies 10 and 11 move to the positions of FIG. 1 when the compact-size tape cassette 3 is loaded in the apparatus 1, and to the positions of FIG. 8 when the standard-size tape cassette 2 is loaded. When in the FIG. 1 positions, the tape loader assemblies 10 and 11 have their guide rollers 10b and 11b and slanting poles 10c and 11c received in the aforesaid recesses 3f and 3g, FIG. 4A, in the compact-size tape cassette 3. When in the FIG. 8 position, on the other hand, the tape loader assemblies 10 and 11 have their guide rollers 10b and 11b and slanting poles 10c and 11c received in the recesses 2g and 2h, FIG. 3, in the standard-size tape cassette 2. The tape loader drive mechanism 9 will be later referred to in more detail.

The fixed base 5 for the rotary head assembly 6 has a pair of V-shaped stops 5a and 5b overhanging the guideways 7 and 8. Traveling along the guideways in the direction of the arrows A and B, the tape loader assemblies 10 and 11 come into abutment against the stops 5a and 5b upon completion of the loading of the magnetic tape against the rotary head assembly 6.

Generally designated 61 in FIG. 1 is a floating chassis for the compact-size tape cassette 3 constituting a feature of this invention. As the name implies, the floating chassis 61 is movable up and down between a working and a retracted position through an aperture 4f formed in the main chassis 4.

Figure 6:
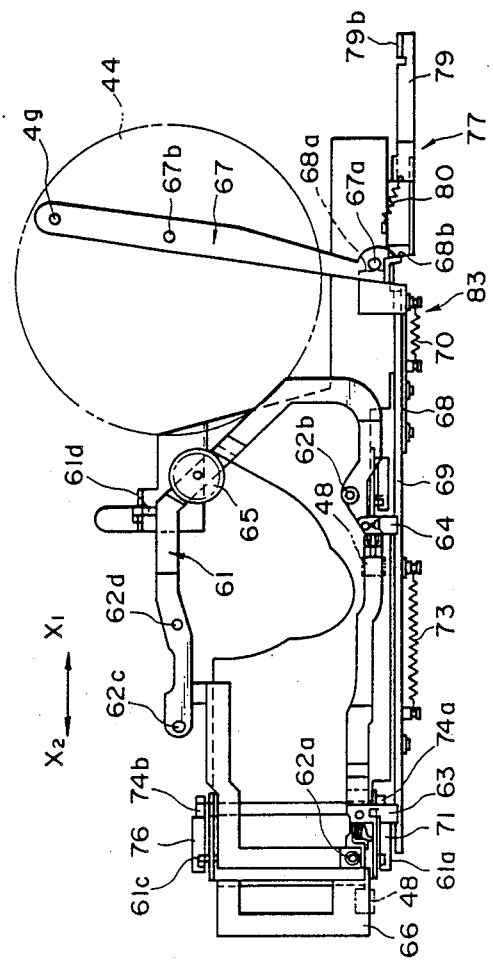
FIG. 6 is a plan view of the floating chassis and its drive means and locking means in the apparatus of FIG. 1, the drive means being shown in the state when the floating chassis is in the working position.
Figure 7:
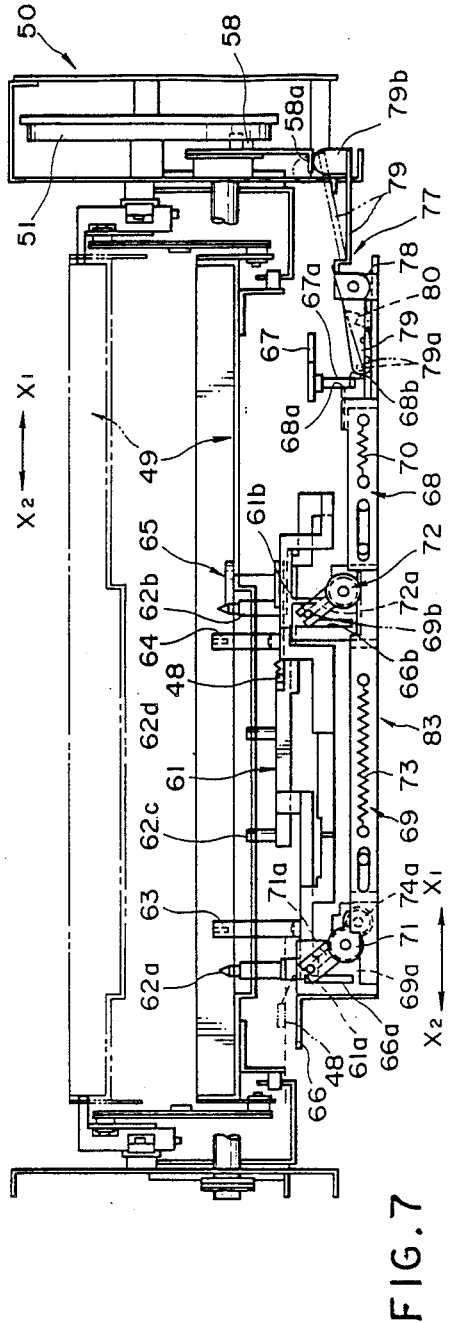
FIG. 7 is a front elevation of the floating chassis, shown in its working position, and other means shown in FIG. 6, the view additionally showing a cassette cradle for carrying the loaded standard- or compact-size tape cassette between an eject position and a record/reproduce position.

As better illustrated in FIGS. 6 and 7, the floating chassis 61 takes the form of a generally rectangular frame. The floating chassis 61 has mounted thereon a set of positioning pins 62a, 62b, 62c and 62d, an anti-erase sensor 63, a tape kind sensor 64, and a reel drive gear 65, all in fixed positions that are predetermined with respect to one another and to the compact-size tape cassette 3. The positioning pins 62a–62d function to position the compact-size tape cassette 3 within the apparatus 1. The anti-erase sensor 63 serves to sense the presence or absence of the anti-erase tab, not seen, on the loaded compact-size tape cassette 3. The tape kind sensor 64 serves to sense the presence or absence of a tape kind hole, also not seen, in the housing of the compact-size tape cassette 3. The hole indicates a particular type of magnetic property of the tape housed in the cassette. The reel drive gear 65 is for driving engagement with the gear 3d, FIGS. 4A and 4B, of the compact-size tape cassette 3 when the floating chassis 61 is raised to its working position.

Figure 13:
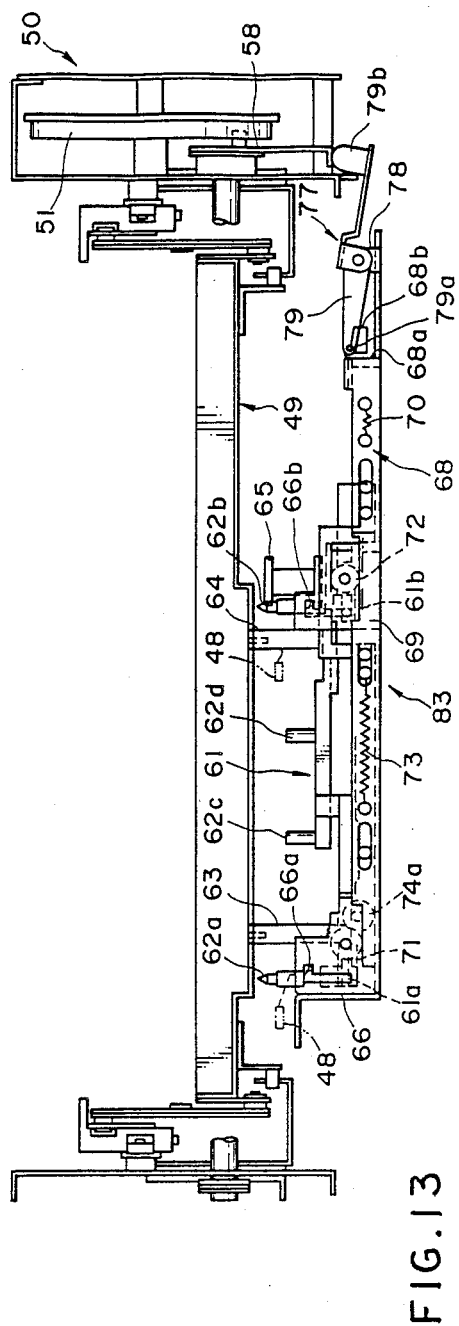
FIG. 13 is a view similar to FIG. 7 except that the floating chassis is shown in the retracted position.

The floating chassis 61 together with the various parts mounted thereon is moved up and down relative to the main chassis 4 between a working position of FIG. 7 and a retracted position of FIG. 13. Both floating chassis 61 and its drive means will be later described in more detail.

With reference back to FIG. 1 a tension arm 13 is proximally pinned at 4a on the main chassis 4 for pivotal motion in a horizontal plane. Erected on the distal end of the tension arm 13 is a tension pole 13a which is to enter the recess 2g in the standard-size tape cassette 2 and the recess 3f in the compact-size tape cassette 3. A helical tension spring 14 extends between a hook on the main chassis 4 and a branch arm 13b joined to the tension arm 13, biasing the latter in a counterclockwise direction as viewed in FIG. 1. Consequently, when the supply-side tape loader assembly 10 is within its reach, the tension arm 13 butts on its carriage 10a under the bias of the tension spring 14 and swings about the pivot pin 4a with the travel of the tape loader assembly 10 along the guide groove 7.

A link 15a, constituting a toggle mechanism 15 in combination with another link 15b, is pin jointed to the tension arm 13 at its midpoint. The toggle mechanism 15 is engaged with one extremity of a brake band 16 which extends around the supply-side drive spindle 18 and which is engaged at the other extremity with an anchor 17 fastened to the main chassis 4.

A full-width erase head 19 is mounted fast on an erase head mount 20 which in turn is pinned at 20a on the main chassis 4 for pivotal motion in a horizontal plane. An impedance roller 21 is also mounted on the erase head mount 20. A tape guide roller 22 is disposed between the erase head mount 20 and the preassigned loading positions of the tape cassettes 2 and 3 which are indicated respectively in FIGS. 1 and 8.

As will be seen from both FIGS. 1 and 8, a guide pole 23 is erected on the free end of a guide arm 24. A half-loading pole 25 is erected on the free end of a half-loading arm 26. Both guide arm 24 and half-loading arm 26 are driven by a pole transfer mechanism 27 yet to be described. Suffice it to say for the moment that the guide pole 23 and half-loading pole 25 take the positions of FIG. 1 for engagement in the recesses 3g and 3h, FIG. 4A, in the compact-size tape cassette 3 when the latter is loaded in the apparatus 1. When the standard-size tape cassette 2 is loaded, on the other hand, the poles 23 and 25 take the positions of FIG. 8 for engagement in the recess 2h, FIG. 3, in that cassette.

Both FIGS. 1 and 8 also show a capstan 30 and a pinch roller 31. The capstan 30 is coupled directly to a capstan motor 30a, disposed under the main chassis 4, for rotation about a vertical axis in a counterclockwise direction as viewed in FIGS. 1 and 8. The pinch roller 31 is rotatably mounted on the free end of a pinch roller arm 32 which is not only swingable in a horizontal plane but also movable up and down with respect to the main chassis 4. It will be seen that the capstan 30 is positioned a considerably distance away from the loading positions of the tape cassettes 2 and 3 in a direction parallel to the principal plane of the main chassis 4. The distance is such that the capstan motor 30a, although much larger in size than the capstan 30, is totally out of register with the loading positions of the tape cassettes 2 and 3. This arrangement of the capstan 30 and the capstan motor 30a is essential for the reduction of the vertical dimension or thickness of the apparatus 1.

A light source 35 for tape end detection is mounted on the free end of a carrier arm 36 which is pinned at 4b on the main chassis 4 for pivotal movement in a horizontal plane. A helical tension spring 37 biases the pivotal carrier arm 36 in a counterclockwise direction as viewed in FIGS. 1 and 8. When the standard-size tape cassette 2 is loaded, the carrier arm 36 is sprung into abutment against a fixed pin 4c on the main chassis 4. Thus the light source 35 becomes positioned for insertion in the hole 2f, FIG. 3, in the housing 2a of the standard-size tape cassette 2. When no tape casette is loaded, or when the compact-size tape cassette 3 is loaded, the carrier arm 36 is pushed by the guide arm 24 against the bias of the tension spring 37 to the position of FIG. 1. The light source 35 is then positioned for engagement in the compact size tape cassette 3.

At 81 is seen an audio/control head disposed between the rotary head assembly 6 and the capstan 30. As is well known, the audio/control head 81 contacts the control track and audio track of the magnetic tape for the recording and reproduction of audio and control signals.

The foregoing has been the outline of the recording-/reproducing apparatus 1. The following, then, is the detailed discussion of the floating chassis 61 and the means for driving the floating chassis between the working and retracted positions. The floating chassis 61 is driven from a drive cam 44, seen in FIGS. 1, 2 and 6, via its follower lever 67 and drive linkage 83 shown in FIG. 7. The drive means for the floating chassis 61 will therefore be better understood by first studying the configuration and functions of the drive cam 44. The drive cam 44 takes the form of a toothed disk disposed on the underside of the main chassis 4 for rotation about a vertical axis. Driven from an electric drive motor 38, the drive cam 44 drives not only the floating chassis 61 via the drive linkage 83 but also the loader drive mechanism 9, the pole transfer mechanism 27, etc., in a manner required by each selected operating mode of the apparatus 1.

As drawn in both FIGS. 1 and 2, the rotation of the drive motor 38 is transmitted to a pulley 40 via a belt 39 and thence to another pulley 42 via another belt 41. The pulley 42 is constrained to joint rotation with a worm 43 coaxially coupled thereto. The drive cam 44 is peripherally toothed for engagement with the worm 43 and thus rotates therewith in a horizontal plane.

As pictorially represented in FIGS. 9A and 9B, the drive cam 44 has two cam grooves 44a and 44b formed in its top face 44A, and three cam grooves 44c, 44d and 44e in its bottom face 44B. The cam groove 44a is for driving the floating chassis 61 via the cam follower lever 67 via the drive linkage 83. The cam groove 44b is for actuating the pole transfer mechanism 27. The cam groove 44c is for actuating the loader drive mechanism 9.

FIG. 6 best indicates the cam follower lever 67 having one end pivotally pinned at 4g to the main chassis 4. A cam follower pin 67b is planted on the cam follower lever 67 at its midpoint for relatively sliding engagement in the cam groove 44a, FIG. 9A, in the top face of the drive cam 44. Formed on the free end of the cam follower lever 67, an actuating pin 67a operatively engages the floating-chassis drive linkage 83, causing the same to move the floating chassis 61 up and down as the cam follower lever swings about its pivot pin 4g in response to the rotation of the drive cam 44.

As has been set forth with reference to FIGS. 6 and 7, the floating chassis 61 has mounted thereon the set of positioning pins 62a, 62b, 62c and 62d, the anti-erase sensor 63, the tape kind sensor 64, and the reel drive gear 65. All these parts are immovable with respect to one another on the floating chassis 61, even though the floating chassis is itself movable up and down relative to the main chassis 4. Therefore, when the floating chassis 61 is raised to its working position of FIG. 7, the various parts thereon can be maintained in their exact preassigned positions for favorable recording or reproduction of information in the compact-size tape cassette 3.

It might be contemplated to independently move the noted parts 62a-62d and 63-65 to their working positions when the compact-size tape cassette 3 is loaded. This alternative is objectionable by reasons of the far greater complexity of means required for such independent movement of the parts, and of the difficulty of assembling such complex means. Moreover, the parts would be held in their relative working positions much less accurately than when they are all rigidly mounted on the common floating chassis 61 as taught herein.

The reader's attention is now called to the details of the anti-erase sensor 63 and the tape kind sensor 64 on the floating chassis 61. These sensors 63 and 64 can be substantially alike in construction. Only the tape kind sensor 64 will therefore be described in detail with reference to FIGS. 10A and 10B, it being understood that the same description substantially applies to the anti-erase sensor 63.

FIG. 10B shows the tape kind sensor 64 as being L shaped, comprising a horizontal pedestal portion 64a and an upright standard portion 64b. The pedestal portion 64a is screwed at 45 to the floating chassis 61, overhangingly supporting the standard portion 64b on the floating chassis. Upon movement of the floating chassis 61 to its working position, the switch knob 46 is to be actuated or unactuated depending upon the presence or absence of the unshown tape kind hole in the loaded compact-size tape cassette 3. (Of course, in the case of the anti-erase sensor 63, a similar switch knob is actuated or unactuated depending upon the presence or absence of the file-protect tab on the compact-size tape cassette 3.)

The tape kind sensor 64 additionally features the fact that it becomes electrically connected to the electronic circuitry, not shown, of the apparatus 1 only upon movement of the floating chassis 61 to its working position. As will be noted also from FIG. 10B, the tape kind sensor 64 has a connector 47 extending laterally from its pedestal portion 64. The connector 47 includes a pair of exposed leads 47a and 47b which are electrically coupled to the tape kind sensor switch comprising the switch knob 46.

FIG. 10A shows another connector 48 mounted to the main chassis 4. The connector 48 has a pair of connector pins 48a and 48b for contact with the pair of leads 47a and 47b of the connector 47 on the floating chassis 61. The connector pins 48a and 48b are electrically connected to a pair of terminals 48$_{a-1}$ and 48$_{b-1}$ which in turn are permanently connected to the unshown electronic circuitry of the apparatus 1.

Thus, upon ascent of the floating chassis 61 to its working position, the pair of leads 47a and 47b of the connector 47 move into forced contact with the pair of pins 48a and 48b of the other connector 48 on the main chassis 4. The tape kind sensor 64 is therefore connected to the unshown electronic circuitry only when the floating chassis 61 is in its working position.

Assume that, contrary to the showings of FIGS. 10A and 10B, the tape kind sensor 64 on the floating chassis 61 were permanently connected to the circuitry of the apparatus 1 via flexible leads. Such leads would have to repeatedly move with the up-and-down travel of the floating chassis 61, ultimately resulting in breakage or in the disconnection of the soldered joints. The construction of FIGS. 10A and 10B precludes such troubles and so contributes to the greater reliability of the apparatus 1.

Reference is directed back to FIGS. 6 and 7 for a detailed consideration of how the floating chassis 61 moves up and down between the working and retracted positions. Seen at 66 is a guide structure 66 secured to the main chassis 4. The guide structure 66 has defined therein four inverted-L-shaped guide slots, only two of which are seen at 66a and 66b in FIG. 7. Slidably engaged in these guide slots are as many pins 61a, 61b, 61c and 61d projecting laterally from the floating chassis 61, so that this chassis travels up and down as guided by the guide structure 66.

The aforesaid drive linkage 83 between the cam follower lever 67 and the floating chassis 61 comprises two elongate sliders 68 and 69 which are joined together under the force of a helical tension spring 70 for bidirectional, rectilinear displacement relative to the guide structure 66, in the directions designated $X_1$ and $X_2$. Another helical tension spring 73 acts on the slider 69 for biasing both sliders 68 and 69 in the $X_1$ direction.

FIG. 7 reveals a pair of racks 69a and 69b formed in one piece with the slider 69. The racks 69a and 69b are in mesh with pinions 71 and 72, respectively, rotatably mounted on the guide structure 66. The pinions 71 and 72 are integrally provided with bifurcated swing arms 71a and 72a operatively engaged with the pins 61a and 61b on the floating chassis 61. The pinion 71 is also in mesh with a gear 74a mounted fast on one end of a rotatable shaft 74, FIG. 6, which has another gear 74b firmly mounted on its other end. The gear 74b engages still another gear, not seen, having a bifurcated swing arm 76 operatively engaged with the pin 61c on the floating chassis 61.

Thus, with the linear travel of the slider 69 in the $X_2$ direction, the bifurcated swing arms 71a, 72a and 76 all rotate in a clockwise direction as seen in FIG. 7, thereby lifting the floating chassis 61 to the working position depicted in this figure. It is the cam follower lever 67, FIG. 6, that causes such up-and-down travel of the floating chassis 61 via the drive linkage 83. Before the loading of the compact-size tape cassette 3, the cam follower lever 67 has been held in such an angular position by the drive cam 44 that the sliders 68 and 69 has been held displaced in the $X_1$ direction under the bias of the tension spring 73.

The reference numeral 77 in FIGS. 6 and 7 generally designates a locking mechanism for locking the floating chassis 61 in its working position of FIG. 7. The locking mechanism 77 comprises a stop member 79 rotatably mounted to a lug 78 formed in one piece with the fixed guide structure 66, and a helical tension spring 80 urging the stop member 79 in a counterclockwise direction as viewed in FIG. 7. The stop member 79 carries a pin 79a on one of its opposite ends for engagement in a recess 68b formed in an extension 68a of the slider 68. Formed on the other end of the stop member 79 is a tongue 79b to be acted upon by a member included in the cassette transfer mechanism 50.

As shown also in FIG. 7, the cassette transfer mechanism 50 is coupled to a cassette cradle 49, in which the standard- or compact-size tape cassette is to be loaded interchangeably, for moving the loaded cassette between a predetermined eject position and a predetermined record/reproduce position, although the standard- and compact-size tape cassettes have slightly different record/reproduce positions, as will become better understood as the description proceeds. Driven by a devoted electric motor, not shown, the cassette transfer mechanism 50 has various working parts disposed on the right hand side of FIG. 7 for the transfer of the cassette cradle 49 between the required positions.

Figure 11A:
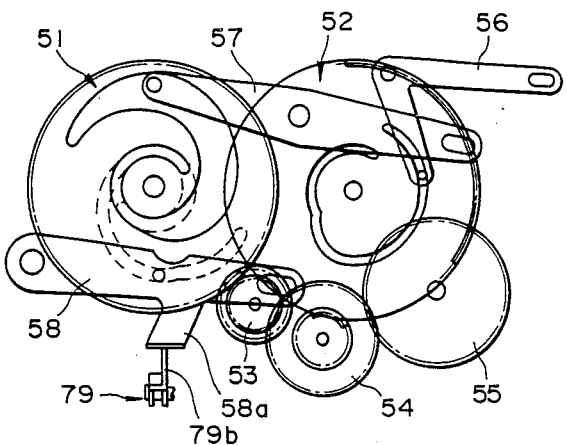
FIGS. 11, 11B and 11C are a series of diagrammatic plan views explanatory of the operation of the cassette transfer means in the apparatus of FIG. 1, the operation of the cassette transfer means being shown in conjunction with the locking means for the floating chassis shown in FIGS. 6 and 7.
Figure 11B:
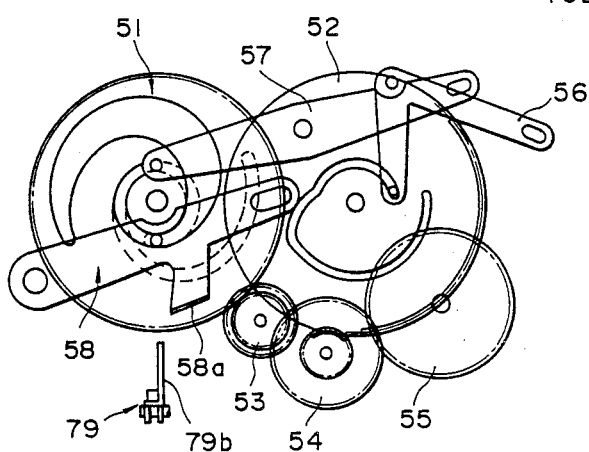
Figure 11C:
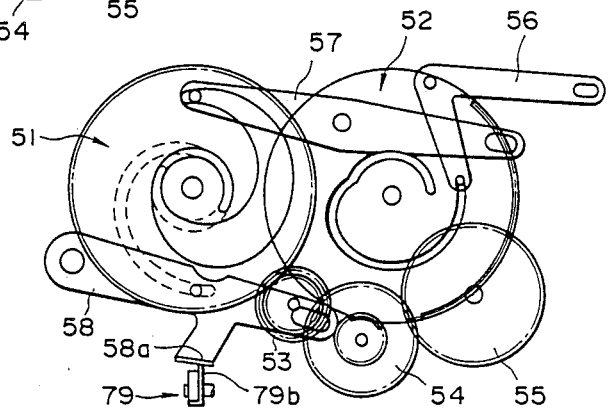

Such constituent parts of the cassette transfer mechanism 50 are shown diagrammatically in FIGS. 11A-11C. The parts seen in these figures are toothed cam disks 51 and 52, gears 53-55, and cam follower levers 56-58. As shown also in FIG. 7, the cam follower lever 58 is driven by the cam disk 51 for moving the cassette cradle 49 up and down. The cam follower lever 58 is formed to include a lug 58a for actuating the floating-chassis-locking mechanism 77 by making abutting engagement with its tongue 79b.

It must be pointed out in connection with the cassette transfer mechanism 50 that the cassette cradle 49 must be moved to different record/reproduce positions depending upon whether the standard- or compact-size tape cassette is loaded therein. More specifically, the cassette cradle 49 must be moved to a lower position when the standard-size tape cassette 2 is loaded than when the compact-size tape cassette 3 is loaded. This is because both types of tape cassettes 2 and 3 make common use of one of the drive spindles 18.

Accordingly, upon loading of the standard-size tape cassette 2, the tongue 79b of the stop member 79 is depressed by the cam follower lever 58, with the consequent rotation of the stop member in a clockwise direction as viewed in FIG. 7. Thereupon the pin 79a on the stop member 79 becomes disengaged from the recess 68b in the slider 68 thereby permitting the sliders 68 and 69 to travel in the $X_1$ direction under the force of the tension spring 73. The result is the descent of the floating chassis 61.

The following is the more detailed description of how the floating chassis 61 is moved up and down by the drive cam 44 via the drive linkage 83, and how the floating chassis is locked in its working position by the cassette transfer mechanism 50 via the locking mechanism 77. Such operational description will be given on the assumption of three different cases: (1) when the cassette cradle 49 is in the eject position; (2) when the cassette cradle is in the record/reproduce position for the compact-size tape cassette 3; and (3) when the cassette cradle is in the record/reproduce position for the standard-size tape cassette 2.

1. When the cassette cradle is in the eject position:

The floating chassis 61 is in the raised position of FIG. 7 when the cassette cradle is in the eject position indicated by the dot-and-dash lines in the same drawing. This is because the drive cam 44 is in the angular position of FIG. 6, holding the cam follower lever 67 pivoted clockwise as in the same figure, when the apparatus 1 is conditioned for the ejection of the tape cassette 2 or 3. So pivoted clockwise, the cam follower lever 67 acts on the slider 68 to cause the same to travel in the $X_2$ direction together with the other slider 69 against the force of the tension spring 73. Consequently, as all the bifurcated swing arms 71a, 72a and 76 are turned clockwise as viewed in FIG. 7, the floating chassis 61 is raised as guided by the guide structure 66.

It will have been seen that the floating chassis 61 is raised by the drive cam 44 via the drive linkage 83. No motor or the like exclusive for driving the floating chassis 61 is used, as the drive cam 44 functions to actuate various other parts of the apparatus 1.

An inspection of FIG. 7 will reveal that the pins 61a-61d on the floating chassis 61 are engaged in the horizontal portions of the inverted-L-shaped guide slots 66a and 66b in the guide structure 66 when the floating chassis is in the raised position. The floating chassis 61 can thus be stably held in that position, even in the face of downward forces of abuse that may be exerted thereon. Such possible downward forces will be thoroughly borne by the fixed guide structure 66, instead of being transmitted to the drive linkage 83, to the cam follower lever 67, or to the drive cam 44. All these parts can thus be positively protected against destruction due to such forces despite the simplicity of construction of the floating-chassis drive mechanism.

Also, when the cassette cradle 49 is in the eject position, the cam follower lever 58 of the cassette transfer mechanism 50 is fully pivoted counterclockwise as represented in FIG. 11B. The lug 58a on the cam follower lever 58 is then retracted away from the tongue 79b of the stop member 79, permitting the latter to be pivoted counterclockwise, as viewed in FIG. 7, under the bias of the tension spring 80. So pivoted to the phantom position of FIG. 7, the stop member 79 has its pin 79a out of engagement with the slider 68. The floating chassis 61 is therefore held raised only by the cam follower lever 67 when the cassette cradle 49 is in the eject position.

2. When the cassette cradle is in the record/reproduce position for the compact-size tape cassette:

The record/reproduce position of the cassette cradle 49 for the compact-size tape cassette 3 is indicated by the solid lines in FIG. 7. When the cassette cradle 49 comes to this position, the cam follower lever 58 of the cassette transfer mechanism 50 turns clockwise from its FIG. 11B position to that of FIG. 11A and so pushes the tongue 79b of the stop member 79. Thereupon the stop member 79 turns to the solid line position of FIG. 7, in which the pin 79a of the stop member lies opposite the recess 68b in the slider 68.

Also, when the cassette cradle 49 with the compact-size tape cassette 3 therein comes to the record/reproduce position, the drive cam 44 rotates to drive the loader drive mechanism 9, pole transfer mechanism 27, etc. Such rotation of the drive cam 44 also causes angular displacement of the cam follower lever 67, with the consequent disengagement of the actuating pin 67a thereon from the slider 68. Since the pin 79a on the stop member 79 has been brought to a position opposite the recess 68b in the slider 68, the disengagement of the pin 67a from the slider 68 results in the engagement of the pin 79a in the recess 68b. The slider 68 is thus restrained from displacement in the $X_1$ direction by the stop member 79, instead of by the cam follower lever 67, thereby holding the floating chassis 61 in the raised position for recording or reproduction of information in the compact-size tape cassette 3.

It will be appreciated that the drive cam 44 can continue rotation as the floating chassis 61 is locked as above state in the raised position by the locking mechanism 77 comprising the stop member 79. The loader drive mechanism 9, pole transfer mechanism 27, etc., can therefore be actuated as required by any selected one of the various operating modes (recording, reproduction, fast-forwarding and rewinding) of the apparatus 1. The compact-size tape cassette 3 can be ejected through the reversal of the foregoing loading procedure.

3. When the cassette cradle is in the record/reproduce position for the standard-size tape cassette:

FIG. 13 shows the cassette cradle 49 in the record/reproduce position for the standard-size tape cassette 2. This record/reproduce position for the standard-size tape cassette is lower as aforesaid than that for the compact-size tape cassette 3. Therefore, as illustrated in FIG. 11C, the cam follower lever 58 has been turned further clockwise than its FIG. 11A position, correspondingly depressing the tongue 79b of the stop member 79. The pin 79a on the stop member 79 does not lie opposite the recess 68b in the slider 68 when the standard-size tape cassette 2 is in the record/reproduce position.

When the standard-size tape cassette 2 is loaded in the record/reproduce position, the drive cam 44 rotates to actuate the loader drive mechanism 9, pole transfer mechanism 27, etc. Driven by the drive cam 44, the cam follower lever 67 turns to carry the actuating pin 67a away from the extension 68a of the slider 68. Since now the pin 79a on the stop member 79 does not lie opposite the recess 68b in the slider 68 as above mentioned, the sliders 68 and 69 are both free to travel in the $X_1$ direction under the force of the tension spring 73. Consequently, the floating chassis 61 descends to the position of FIG. 13. The positioning pins 62a–62d, anti-erase sensor 63, tape kind sensor 64 and drive gear 65 on the floating chassis 61 have all been retracted out of interference with the standard-size tape cassette 2.

Also, with the floating chassis 61 lowered to the FIG. 13 position, the drive cam 44 is mechanically disconnected from the drive linkage 83 to the floating chassis 61. The drive cam 44 is therefore free to continue rotation for actuating the loader drive mechanism 9, pole transfer mechanism 27, etc., as required by the particular mode of operation of the apparatus 1.

Figure 12:
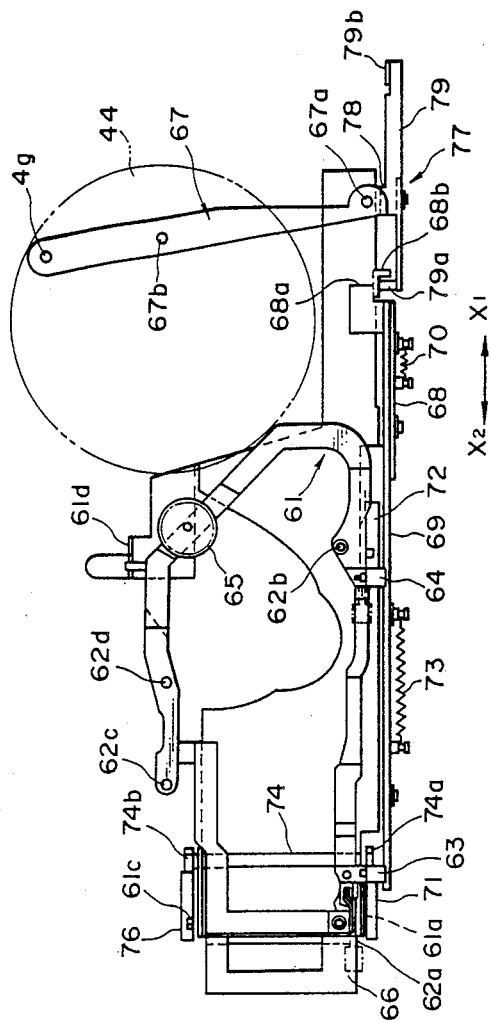
FIG. 12 is a view similar to FIG. 6 except that the drive means for the floating chassis is shown in the state when the floating chassis is in the retracted position.

The standard-size tape cassette can be ejected through the reversal of the foregoing loading procedure. As has been stated, the floating chassis 61 is raised when the apparatus 1 is conditioned for ejection. For raising the floating chassis 61 at the time of the ejection of the standard-size tape cassette 2, the drive cam 44 rotates from its position $P_2$ to position $P_1$ in FIG. 9A. Then, as the cam follower lever 67 rotates clockwise from its FIG. 12 position, for example, the actuating pin 67a thereon comes into abutment against the extension 68a of the slider 68, causing the same to move in the $X_2$ direction against the force of the tension spring 73.

As may have been understood from the foregoing, the locking mechanism 77 engages the drive linkage 83 for locking the floating chassis 61 in the raised position only when the compact-size tape cassette 3 is loaded. The construction of the locking mechanism 77 is materially simplified by taking advantage of the difference between the vertical positions of the standard- and compact-size tape cassettes 2 and 3.

The floating chassis 61 is designed to carry the various parts related to the compact-size tape casette 3. However, the tape kind sensor 64 may be omitted in some type of recording/reproducing apparatus which does not require the sensing function.

With reference back to FIG. 1 the pole transfer mechanism 27 comprises a cam follower lever 45 disposed on the underside of the main chassis 4, a side 46 bidirectionally driven by the cam follower lever 45 in the directions $X_1$ and $X_2$, and a sector gear 47. Pivoted at one end by a pin 4d on the main chassis 4, the cam follower lever 45 carries a pin 45a on its other end which is slidably engaged in an arcuate slot 46a in the slide 46. Also, at a midpoint of the cam follower lever 45, a cam follower pin 45b is erected for sliding engagement in the groove 44b, FIG. 9A, in the drive cam 44. It is thus seen that the pole transfer mechanism 27 is also driven by the drive cam 44.

The slide 46 has three rectilinear slots 46b–46d defined therein, in addition to the arcuate slot 46a. These additional slots 46b–46d slidably receive a pin 24a on the guide arm 24, a pin 26a on the half-loading arm 26, and a shaft 47a of the sector gear 47, respectively. Also, the slide 46 has a projection 46e for abutting engagement with a pin 47b on the sector gear 47, and another projection 46f for abutting engagement with a pin 26b on the half-loading arm 26.

The guide arm 24 has a set of gear teeth 24b formed on its base end for engagement with the teeth of the sector gear 47. A helical tension spring 48 biases the sector gear 47 in a clockwise direction, as viewed in FIG. 1, so that the pin 47b on the sector gear normally butts on the projection 46e of the slide 46.

Such being the construction of the pole transfer mechanism 27, the cam follower lever 45 swings about its pivot 4d with the rotation of the drive cam 44. The swinging motion of this cam follower lever 45 is translated into the linear motion of the slide 46, which in turn is translated into the swinging motion of the guide arm 24 and the half-loading arm 26.

Figure 14:
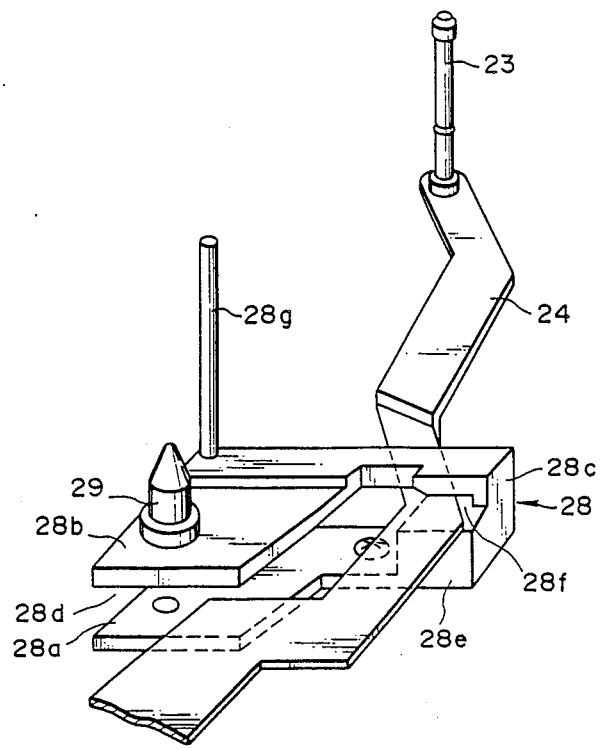
FIG. 14 is an enlarged perspective view of the arm rest, shown together with the guide arm being held thereby, in the apparatus of FIG. 1.

FIG. 14 is an enlarged illustration of the arm rest or support 28 disposed in the path of the guide arm 24 as the latter swings clockwise from its FIG. 1 or 8 position for pulling out the tape from the loaded tape cassette into engagement with the capstan 30. The arm rest 28 takes the form of a metal-made member formed in the shape of a recumbent U, comprising a bottom portion 28a fastened to the main chassis, a top portion 28b extending parallel to the bottom portion, and an upstanding portion 28c bridging the top and bottom portions. Thus the arm rest 28 defines a recess 28d for receiving the guide arm 24. It will further be observed that the recess 28d is stepped at 28e to provide a deepest portion 28f of reduced width or vertical dimension. This deepest portion 28f is intended to relatively closely receive the guide arm 24 at the end of its clockwise swing from its FIGS. 1 or 8 position.

A tape guide pin 28g and the positioning pin 29 are both rigidly mounted on the top position 28b of the arm rest 28. The positioning pin 29 coacts as aforesaid with the other three positioning pins 33a–33c, FIG. 1, on the main chassis 4 to determine the vertical position of the standard-size tape cassette 2 on the main chassis.

It will therefore be seen that the positioning pin 29 is not to interfere with the swinging movement of the guide arm 24. Although the standard-size tape cassette 2 is loaded on the positioning pin 29, the metal-made arm rest 28 can be constructed sufficiently strong to withstand the weight of the tape cassette against the possibility of deformation, even in the presence of the recess 28d therein.

Reference is directed once again to FIG. 1 for the detailed study of the drive mechanism 9 for the pair of tape loader assemblies 10 and 11. The tape loader drive mechanism 9 includes a cam follower lever 49 medially pivoted at 4e on the underside of the main chassis 4. The cam follower lever 49 carries a cam follower pin 49b slidably engaged in a groove 44d, FIG. 9B, in the drive cam 44. The other end of the cam follower lever 49 is formed into a sector gear 49a in mesh with a loader drive gear 50. This gear is capable of joint rotation with a link 52 which is operatively coupled thereto via a helical tension spring 51, and the link 52 is operatively coupled to the tape loader assembly 11 via another link 53. Thus, upon clockwise rotation of the cam follower lever 49, the loader drive gear 50 rotates counterclockwise with the link 52. With such rotation of the link 52 the tape loader assembly 11 travels rearwardly along the guideway 8, as indicated by the arrow B.

The loader drive gear 50 also meshes with another loader driver gear 54, to which a link 56 is operatively coupled via a helical tension spring 55. The link 56 is operatively coupled to the other tape loader assembly 10 via another link 57. Therefore, with the counterclockwise rotation of the first loader drive gear 50, the second loader drive gear 54 rotates clockwise with the link 56. This clockwise rotation or the gear 54 is transmitted via the links 56 and 57 to the tape loader assembly 10, causing the latter to travel rearwardly along the guideway 7, as indicated by the arrow A.

The tape loader drive mechanism 9 and the pole transfer mechanism 27 operates as follows with respect to the standard- and compact-size tape cassettes 2 and 3. The various movable parts of the apparatus 1 are in the positions of FIG. 1, which correspond to the compact-size tape cassette 3, when no tape cassette is loaded.

First, upon loading of the compact-size tape cassette 3, the apparatus 1 determines this cassette as being of the compact size by a cassette discriminate switch, not shown, incorporated therein. A method of determining the size of the cassettes. i.e. either the compact-size or the standard-size applicable to the present invention, is disclosed in the European laid-open patent application No. 0311390 filed by the same applicant as the present invention, therefore a detailed explanation of the determination is omitted in this specification. When the cassette cradle 49 carrying the compact-size tape cassette 3 descends to the record/reproduce position indicated by the solid lines in FIG. 7, the guide poles 10b and 11b and slanting poles 10c and 11c of the tape loader assemblies 10 and 11, the tension pole 13a on the tension arm 13, the guide pole 23 on the guide arm 24, and the half-loading pole 25 on the half-loading arm 25 are all received in the recesses 3f, 3g and 3h, FIG. 4A, in the compact-size tape cassette 3. The light source 35 on the carrier arm 36 is also received in the recess 3h in the compact-size tape cassette 3.

Also, upon descent of the compact-size tape cassette 3 to the record/reproduce position, the supply-side drive spindle 18 becomes engaged in the supply hub hole 3c in the cassette. Further the drive gear 65 on the floating chassis 61 become engaged with the driven gear 3d on the takeup hub of the cassette 3.

Figure 15A:
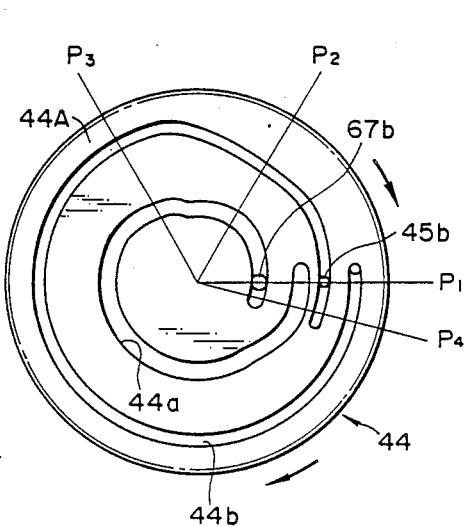
FIGS. 15A and 15B are views similar to FIGS. 9A and 9B except that the drive cam is shown to explain the operation of the tape loader drive mechanism and the pole transfer mechanism in the apparatus of FIG. 1.
Figure 15B:
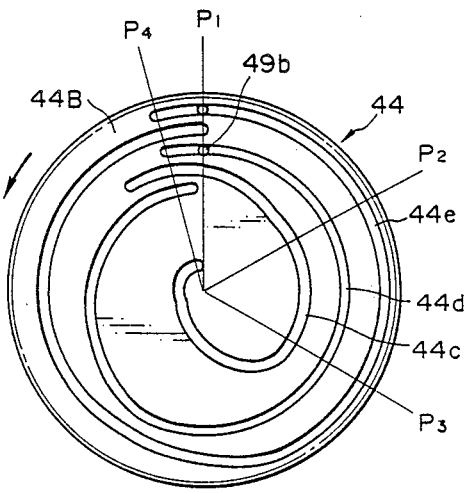

Still further, in response to the loading of the tape cassette 3 in the record/reproduce position, the unshown electronic circuitry of the apparatus 1 sets the drive motor 38 into temporary rotation to cause angular displacement of the drive cam 44 from its position $P_1$ to position $P_3$ in the arrow-marked direction in FIGS. 15A and 15B. The apparatus 1 is now in the half-loaded state depicted in FIG. 16.

Figure 16:
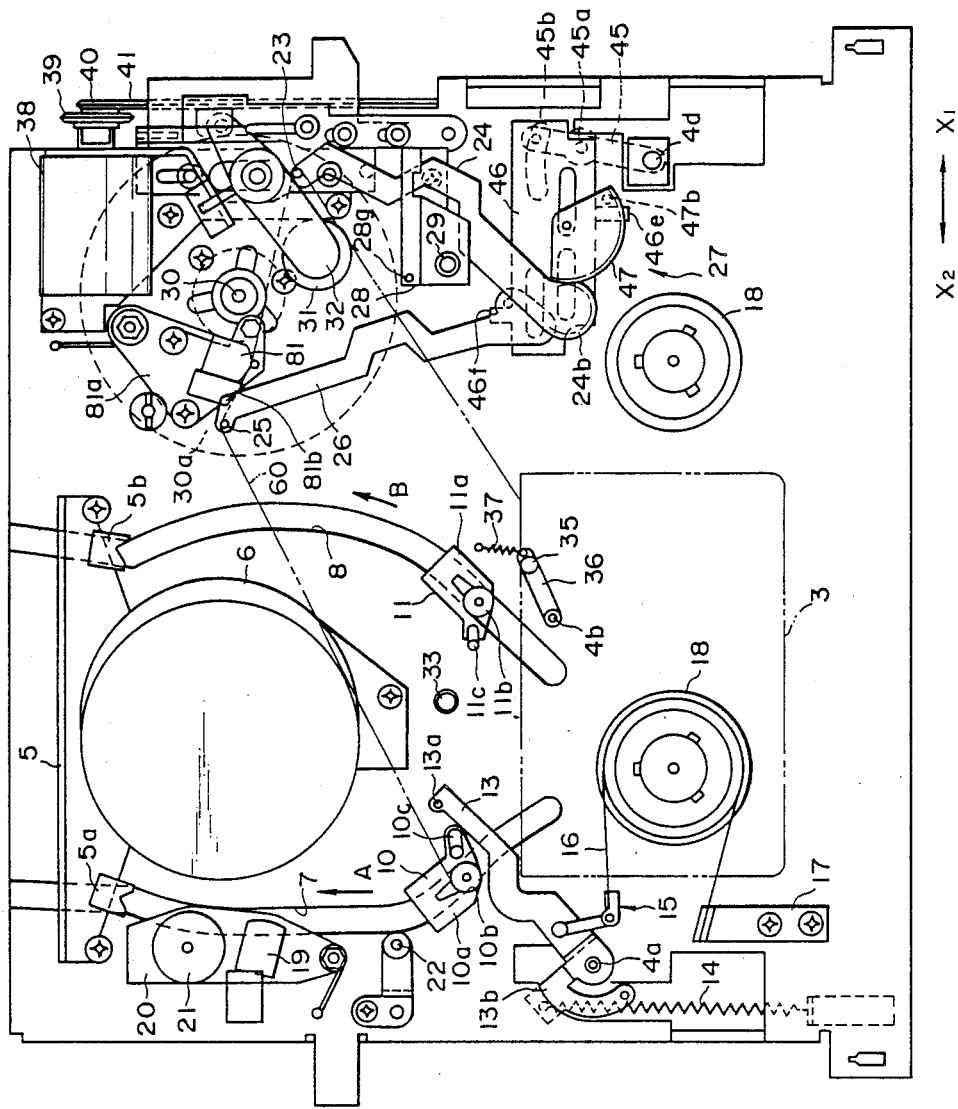
FIG. 16 is a view somewhat similar to FIG. 1 except that the apparatus is shown with the compact-size tape cassette in the half-loaded state, the view not showing the floating chassis for simplicity.

A comparison of FIGS. 1 and 16 will indicate that the cam follower lever 45 of the pole transfer mechanism 27 has been turned clockwise about its pivot 4d, causing linear displacement of the slide 46 in the $X_1$ direction. So displaced, the slide 46 acts on the pin 47b of the sector gear 47 via the projection 46e, causing the sector gear to rotate counterclockwise, with the consequent clockwise rotation of the guide arm 24. The other projection 46f of the slide 46 also acts on the pin 26b of the half-loading arm 26, causing the latter to rotate clockwise, too.

With such clockwise rotation of the guide arm 24 and half-loading arm 26, the guide pole 23 and half-loading pole 25 on these arms pull out the magnetic tape from the compact-size tape cassette 3 being held in the record/reproduce position. FIG. 16 indicates at 60 the magnetic tape thus pulled out into contact with the capstan 30.

As has been stated, the guide arm 24 is longer than in the prior art because of the placement of the capstan 30 at a distance from the loading positions of the tape cassettes 2 and 3. The elongate guide arm 24 can, however, be stably supported in the reduced width portion 28f, FIG. 14, of the recess 28d in the metal-made arm rest 28 when fully turned to its FIG. 16 position. The arm rest 28 holds the midportion of the guide arm 24 against displacement at least in the vertical direction. Moreover, the arm rest 28 serves the additional purpose of supporting the positioning pin 29 thereon, permitting the guide arm 24 to swing between the positions of FIGS. 1 and 16 without interference with the positioning pin.

As is conventional in the art, the magnetic tape 60 is fast-forwarded or rewound in this half-loaded state of FIG. 16. The tape is fed at such high speed for fast forwarding or rewinding that the guide pole 23 on the guide arm 24 is subjected to considerable tape tension. However, being securely supported by the rigid arm rest 28, the guide arm 24 is protected from deflection or vibration due to the high speed tape travel.

The half-loading arm 26, on the other hand, is also engaged in a recess 81b in a mount 81a of the audio control head 91 when fully turned to the FIG. 16 position. It will therefore be understood that the tape 60 can stably travel along the path determined by the guide roller 10a, half-loading pole 25 and guide pole 23.

The cam follower lever 49 also rotates clockwise, as viewed in FIG. 1, with the rotation of the drive cam 44, thereby causing the pair of tape loader assemblies 10 and 11 to travel from their FIG. 1 position to that of FIG. 16. Also, with the travel of the tape loader assembly 10 in the direction of the arrow A, the tension arm 13 turns counterclockwise about its pivot 4a under the bias of the tension spring 14. Thus, as illustrated in FIG. 16, the magnetic tape 60 is now held against the rotary head assembly 6 as it extends between the guide pole 10b of the tape loader assembly 10 and the half-loading pole 25 on the half-loading arm 26, and against the audio control head 81 as it extends between the half-loading pole 25 and the guide pole 23 on the guide arm 24.

The unshown control, circuitry of the apparatus 1 may now be actuated in the known manner for recording or reproduction with the loaded compact-size tape cassette 3. So actuated, the control circuitry again sets the drive motor 38 in rotation thereby causing the drive cam 44 to rotate from its position P$_3$ to position P$_4$ in FIGS. 15A and 15B.

Figure 17:
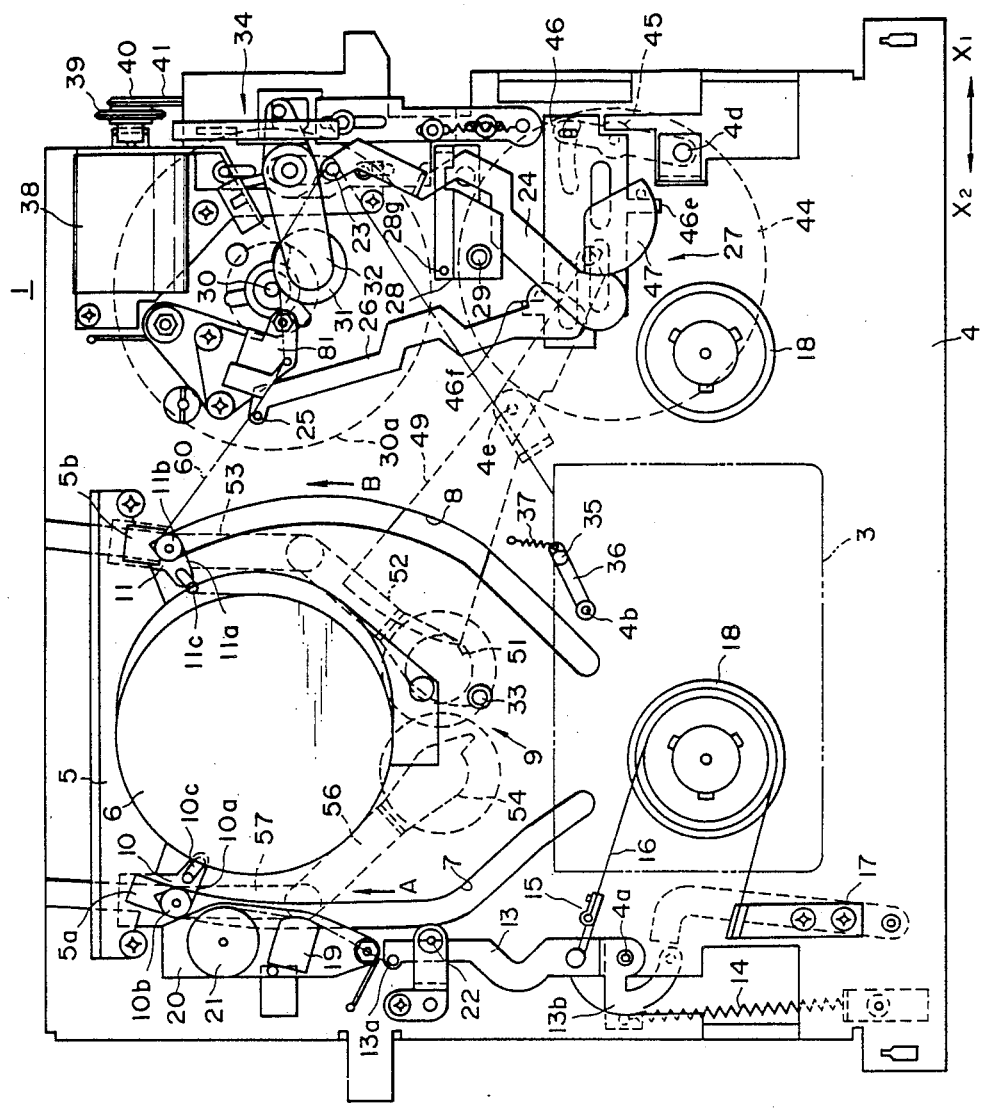
FIG. 17 is a view similar to FIG. 16 except that the apparatus is shown with the compact-size tape cassette fully loaded for recording or reproduction.

FIG. 17 illustrates the results. With the link pair 52 and 53 and the other link pair 56 and 57 of the tape loader drive mechanism 9 both extended by the clockwise rotation of the cam follower lever 49, the pair of tape loader assemblies 10 and 11 travel along the guideways 7 and 8 into abutment against the stops 5a and 5b. The magnetic tape 60 is now loaded fully against the rotary head assembly 6. Also, with such travel of the tape loader assembly 10, the tension arm 13 is further turned counterclockwise until the tension pole 13a becomes positioned between the full-width erase head 19 and the tape guide roller 22.

As is conventional in the art, the pinch roller arm 32 descends with the pinch roller 31 thereon with the travel of the tape loader assemblies 10 and 11 toward the stops 5a and 5b. Then the pinch roller arm 32 turns clockwise, as viewed in FIG. 17, thereby pressing the pinch roller 31 against the capstan 30 interposing the magnetic tape 60.

Now the apparatus 1 is ready for the commencement of recording or reproduction. As the drive gear 65, not shown in FIG. 17, on the floating chassis 61 drives the driven gear 3d on the takeup hub of the compact-size tape cassette 3, the magnetic tape 60 travels past the full-width erase head 19, impedance roller 21, rotary head assembly 6, audio control head 81, capstan 30 and pinch roller 31, and guide pole 23.

As has been set forth with reference to FIG. 14, the guide arm 24 carrying the guide pole 23 is now securely caught in the narrowed deepest part 28f of the recess 28d in the arm rest 28. Consequently, despite its extended length, the guide arm 24 is protected from deflection and vibration due to tape travel in contact with the guide pole 23 thereon, thereby contributing to the stability of tape transportation.

The rotation of the drive motor 38 is reversed for the ejection of the compact-size tape cassette 3. As the drive cam 44 is thus driven in the direction opposite to that during loading, the tape cassette 3 is ejected through the reversal of the foregoing procedure.

The following is the operational description of the tape loader drive mechanism 9 and the pole transport mechanism 27 in response to the loading of the standard-size tape cassette 2. In this apparatus 1, as has been mentioned, the various movable parts have been in the FIG. 1 positions, corresponding to the compact-size tape cassette 3, before the loading of the standard-size tape cassette 2. Therefore, as the unshown cassette discriminate switch detects the loading of the standard-size tape cassette 2, the unshown control circuitry actuates the drive motor 38 to cause rotation of the drive cam 44 approximately 60 degrees to the position P$_2$ in FIGS. 15A and 15B.

Consequently, as the cam follower lever 49 of the tape loader drive mechanism 9 rotates clockwise, the pair of tape loader assemblies 10 and 11 travel from their FIG. 1 positions to those of FIG. 8 corresponding to the standard-size tape cassette 2. Also, as the slide 46 travels in the X$_1$ direction with the rotation of the cam follower lever 45 of the pole transfer mechanism 27, the guide arm 24 and the half-loading arm 26 also swing from their FIG. 1 position to those of FIG. 8.

Upon subsequent descent of the cassette cradle 49, with the standard-size tape cassette 2 received therein, to the record/reproduce position of FIG. 13, the cassette comes to rest on the positioning pins 29 and 33a-33c. At the same time, as will be understood from FIG. 8, the guide poles 10b and 11b and slanting poles 10c and 11c of the tape loader assemblies 10 and 11, the tension pole 13a on the tension arm 13, the guide pole 23 on the guide arm 24, and the half-loading pole 25 on the half-loading arm 25 are all received in the recesses 2g and 2h, FIG. 3, in the standard-size tape cassette 2. The light source 35 on the carrier arm 36 is also received in the hole 2f in the standard-size tape cassette 2. Still further, the pair of drive spindles 18 become engaged in the pair of hub holes 2d and 2e in the standard-size tape cassette 2.

Thereafter the various movable parts of the apparatus 1 travel to the positions of FIG. 16 and thence, when the apparatus is conditioned for recording or reproduction, to the positions of FIG. 17, through the same procedure as with the compact-size tape cassette 3. The ejection of the standard-size tape cassette 2 is possible through the reversal of the foregoing procedure.

We claim:

1. A compatible recording/reproducing apparatus for selective use with a relatively large-size tape cassette and a relatively small-size tape cassette, the small-size tape cassette having a driven gear, the apparatus comprising:
   (a) a main chassis having a principal plane;
   (b) first positioning means fixedly mounted on the main chassis for positioning the large-size tape cassette thereon;
   (c) a first and a second drive spindle on the main chassis for driving engagement with the large-size tape cassette positioned on the first positioning means;
   (d) a floating chassis mounted to the main chassis for displacement in a direction at right angles with the principal plane of the main chassis;
   (e) second positioning means fixedly mounted on the floating chassis for positioning the small-size tape cassette thereon, which is smaller than the large-size tape cassette;
   (f) a drive gear rotatably mounted in a preassigned position on the floating chassis for driving engagement with the driven gear of the small-size tape cassette positioned on the second positioning means, the first drive spindle also making driving engagement with the small-size tape cassette positioned on the second positioning means; and
   (g) floating-chassis drive means for moving the floating chassis relative to the main chassis between a working position, where the floating chassis has the small-size tape cassette positioned on the second positioning means thereon, with the driven gear of the small-size tape cassette in engagement with the drive gear on the floating chassis, and a retracted position where the second positioning means and the drive gear on the floating chassis are out of interference with the large-size tape cassette positioned on the first positioning means on the main chassis.

2. The compatible recording/reproducing apparatus of claim 1 further comprising locking means for positively locking the floating chassis in the working position.

3. The compatible recording/reproducing apparatus of claim 1 further comprising an anti-erase sensor mounted in a preassigned position on the floating chassis in order to determine whether the small-size tape cassette positioned on the second positioning means is protected against erasure or not.

4. The compatible recording/reproducing apparatus of claim 3 wherein the anti-erase sensor has a first connector on the floating chassis, and wherein a second connector is mounted to the main chassis, the first connector being in electric contact with the second connector only when the floating chassis is in the working position.

5. The compatible recording/reproducing apparatus of claim 1 further comprising:
   (a) a capstan rotatably mounted on the main chassis, the capstan being distanced both from the position of the large-size tape cassette on the first positioning means and from the position of the small-size tape cassette on the second positioning means in a direction parallel to the principal plane of the main chassis;
   (b) a guide arm pivotally mounted on the main chassis for pulling out magnetic tape from the large- or small-size tape cassette positioned on the apparatus and for threading the tape through the capstan; and
   (c) an arm rest rigidly mounted on the main chassis for securely holding the guide arm when the latter is positioned for threading the magnetic tape through the capstan.

6. The compatible recording/reproducing apparatus of claim 5 wherein the arm rest is a recumbent-U-shaped member of rigid material, defining a recess for relatively closely receiving the guide arm when the latter is pivoted to the position for threading the magnetic tape through the capstan.

7. The compatible recording/reproducing apparatus of claim 6 wherein the first positioning means comprises a set of positioning pins, one of the positioning pins being formed on the arm rest in order to avoid collision with the guide arm.

8. A compatible recording/reproducing apparatus for selective use with a relatively large-size tape cassette and a relatively small-size tape cassette which is smaller than the former, the small-size tape cassette having a driven gear, the apparatus comprising:
   (a) a main chassis having a principal plane;
   (b) a cassette cradle to be loaded interchangeably with the large- or small-size tape cassette, the cassette cradle being movable relative to the main chassis for carrying the tape cassette between an eject position and either of two different record/reproduce positions depending upon whether the large- or small-size tape cassette is loaded therein;
   (c) cassette transfer means for moving the cassette cradle between the eject position and either of the two record/reproduce positions;
   (d) first positioning means on the main chassis for positioning thereon the large-size tape cassette when the latter is carried to the record/reproduce position by the cassette cradle;
   (e) a first and a second drive spindle on the main chassis for driving engagement with the large-size tape cassette positioned on the first positioning means;
   (f) a floating chassis movably mounted to the main chassis for displacement in a direction at right angles with the principal plane of the main chassis;
   (g) second positioning means fixedly mounted on the floating chassis for positioning thereon the small-size tape cassette when the latter is carried to the record/reproduce position by the cassette cradle;
   (h) a drive gear rotatably mounted in a preassigned position on the floating chassis for driving engagement with the driven gear of the small-size tape cassette positioned on the second positioning means, the first drive spindle also making driving engagement with the small-size tape cassette positioned on the second positioning means;
   (i) floating-chassis drive means for moving the floating chassis relative to the main chassis between a working position, where the floating chassis has the small-size tape cassette positioned on the second positioning means thereon, with the driven gear of the small-size tape cassette in engagement with the drive gear on the floating chassis, and a retracted position where the second positioning means and the drive gear on the floating chassis are out of interference with the large-size tape cassette positioned on the first positioning means on the main chassis; and (j) floating-chassis-locking means connected between the cassette transfer means and the floating-chassis drive means and acted upon by the cassette transfer means for securely locking the floating chassis in the working position when the cassette transfer means operates to move the cassette cradle, loaded with the small-size tape cassette, to the record/reproduce position for the small-size tape cassette.

9. The compatible recording/reproducing apparatus of claim 8 wherein the floating-chassis drive means comprises:
   (a) a drive cam;
   (b) a cam follower driven by the drive cam; and
   (c) a drive linkage connected between the cam follower and the floating chassis for moving the latter between the working and retracted positions in response to the actuation of the cam follower by the drive cam.

10. The compatible recording/reproducing apparatus of claim 9 wherein the floating-chassis-locking means comprises a stop member acted upon by the cassette transfer means for movement into and out of locking engagement with the drive linkage, the stop member engaging the drive linkage for causing the same to lock the floating chassis in the working position when the cassette transfer means operates to move the cassette cradle to the record/reproduce position for the small-size tape cassette.

11. The compatible recording/reproducing apparatus of claim 9 wherein the drive linkage of the floating-chassis drive means comprises:
   (a) slider means capable of reciprocating movement relative to the main chassis;
   (b) resilient means biasing the slider means in a first direction, the cam follower acting on the slider means for moving the same in a second direction, opposite to the first direction, against the bias of the resilient means; and
   (c) motion-translating means connected between the slider means and the floating chassis for moving the latter to the retracted position in response to the movement of the slider means in the first direction, and to the working position in response to the movement of the slider means in the second direction.

12. The compatible recording/reproducing apparatus of claim 11 wherein the floating-chassis-locking means comprises a stop member acted upon by the cassette transfer means for movement into and out of locking engagement with the slider means of the drive linkage, the stop member engaging the slider means for locking the same against movement in the first direction under the bias of the resilient means when the cassette transfer means operates to move the cassette cradle to the record/reproduce position for the small-size tape cassette.

* * * * *